United States Patent
Anderson et al.

(10) Patent No.: US 10,083,219 B2
(45) Date of Patent: Sep. 25, 2018

(54) ENHANCED KNOWLEDGE DELIVERY AND ATTAINMENT USING A QUESTION ANSWERING SYSTEM

(71) Applicant: International Business Machines Corporation, Armonk, NY (US)

(72) Inventors: Erik D. Anderson, Austin, TX (US); Howard N. Anglin, Austin, TX (US); Anthony J. Arcuri, Austin, TX (US); James C. Palistrant, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 14/594,270

(22) Filed: Jan. 12, 2015

(65) Prior Publication Data
US 2016/0203208 A1 Jul. 14, 2016

(51) Int. Cl.
*G06F 17/00* (2006.01)
*G06F 17/30* (2006.01)
*G09B 7/00* (2006.01)

(52) U.S. Cl.
CPC .. *G06F 17/30598* (2013.01); *G06F 17/30654* (2013.01); *G06F 17/30707* (2013.01); *G09B 7/00* (2013.01)

(58) Field of Classification Search
CPC ............... G09B 7/00; G06F 17/30654; G06F 17/30707
See application file for complete search history.

(56) References Cited

U.S. PATENT DOCUMENTS

| | | | |
|---|---|---|---|
| 7,733,366 B2* | 6/2010 | Beavers | G09B 5/00 348/14.08 |
| 8,495,496 B2 | 7/2013 | Bastide et al. | |
| 9,436,758 B1* | 9/2016 | Lewis | G06F 17/30654 |
| 2002/0107681 A1 | 8/2002 | Goodkovsky | |
| 2008/0201174 A1* | 8/2008 | Ramasubramanian | G06F 19/3456 705/3 |
| 2009/0287678 A1 | 11/2009 | Brown et al. | |
| 2011/0039246 A1 | 2/2011 | Packard et al. | |
| 2011/0066587 A1 | 3/2011 | Ferrucci et al. | |

(Continued)

FOREIGN PATENT DOCUMENTS

JP 3234977 B2 12/2001

OTHER PUBLICATIONS

DilogR, http://dilogr.com/, retrieved from the Internet on Oct. 29, 2014, 7 pages.

(Continued)

*Primary Examiner* — Charles Edward Lu
(74) *Attorney, Agent, or Firm* — Stephen R. Tkacs; Stephen J. Walder, Jr.; Diana R. Gerhardt

(57) ABSTRACT

A mechanism is provided in a data processing system for presentation delivery. The mechanism delivering a presentation content to a group of users and receives a plurality of questions concerning the presentation content from the group of users. The mechanism stores the plurality of questions in a question history database and clusters the plurality of questions in the question history database into one or more question clusters. The mechanism determines a topic for each of the one or more question clusters to form one or more question topics and generates feedback for updating the presentation content based on the one or more question topics.

20 Claims, 5 Drawing Sheets

(56) References Cited

U.S. PATENT DOCUMENTS

| | | | | |
|---|---|---|---|---|
| 2011/0125734 | A1* | 5/2011 | Duboue | G09B 7/00 707/723 |
| 2011/0300526 | A1* | 12/2011 | McDonald | G09B 5/12 434/350 |
| 2011/0318716 | A1 | 12/2011 | Higgins et al. | |
| 2012/0301864 | A1* | 11/2012 | Bagchi | G09B 7/02 434/362 |
| 2013/0007055 | A1 | 1/2013 | Brown et al. | |
| 2013/0018652 | A1 | 1/2013 | Ferrucci et al. | |
| 2013/0024457 | A1* | 1/2013 | Chua | G06F 17/3061 707/740 |
| 2013/0066886 | A1 | 3/2013 | Bagchi et al. | |
| 2013/0246327 | A1* | 9/2013 | Tabrizi | G06N 5/022 706/50 |
| 2013/0252222 | A1 | 9/2013 | Fox et al. | |
| 2013/0311409 | A1* | 11/2013 | Ye | G06N 99/005 706/12 |
| 2014/0024009 | A1* | 1/2014 | Nealon | G09B 5/12 434/362 |
| 2014/0176665 | A1* | 6/2014 | Gottlieb | H04N 7/15 348/14.08 |

OTHER PUBLICATIONS

"Intelligent Tutoring System", http://en.wikipedia.org/wiki/Intelligent_tutoring_system, retrieved from the Internet on Oct. 29, 2014, 18 pages.

"Virtual Chat Agent", http://www.supportmachines.com/Virtual_Chat_Agent.aspx, retrieved from the Internet on Oct. 29, 2014, 3 pages.

Cochrane, Thomas A., "Enhancing Oral Presentation Skills of Engineering Students: Technology to the Rescue with the Virtual-i Presenter (ViP)", American Society for Engineering Education, 2009, 12 pages.

Ferrucci, David et al., "Building Watson: An Overview of the DeepQA Project", Association for the Advancement of Artificial Intelligence, Fall 2010, 21 pages, http://www.aaai.org/ojs/index.php/aimagazine/articie/view/2303.

High, Rob, "The Era of Cognitive Systems: An Inside Look at IBM Watson and How it Works", IBM Corporation, Redbooks, Dec. 12, 2012, 16 pages.

Lai, Yen-Shou et al., "Screen-capturing System with Two-layer Display for PowerPoint Presentation to Enhance Classroom Education", Educational Technology & Society, 14 (3), 2011, pp. 69-81.

McCord, M.C. et al., "Deep parsing in Watson", IBM J. Res. & Dev. vol. 56 No. 3/4 Paper 3, May/Jul. 2012, pp. 3:1-3:15.

Putnam, Dean, "Technologies to Aid Real-Time Training, Evaluation of Student Performance, and Capture of Performance Metrics", http://www.navysbir.com/n13_I/N131-048.htm, retrieved from the Internet on Oct. 29, 2014, 3 pages.

Rudd, Dr. Jim et al., "Education for a Smarter Planet: The Future of Learning", IBM RedBooks, 2009, 38 pages.

Yuan, Michael J., "Watson and healthcare, How natural language processing and semantic search could revolutionize clinical decision support", IBM developerWorks, IBM Corporation, Apr. 12, 2011, 14 pages.

* cited by examiner

ENHANCED KNOWLEDGE DELIVERY AND ATTAINMENT USING A QUESTION ANSWERING SYSTEM

BACKGROUND

The present application relates generally to an improved data processing apparatus and method and more specifically to mechanisms for enhanced knowledge delivery and attainment using a question answering system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and the IBM Watson™ system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY in one illustrative embodiment, a method, in a data processing system, is provided for presentation delivery. The method comprises delivering presentation content to a group of users and receiving a plurality of questions concerning the presentation content from the group of users. The method further comprises storing the plurality of questions in a question history database and clustering the plurality of questions in the question history database into one or more question clusters. The method further comprises determining a topic for each of the one or more question clusters to form one or more question topics and generating feedback for updating the presentation content based on the one or more question topics.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
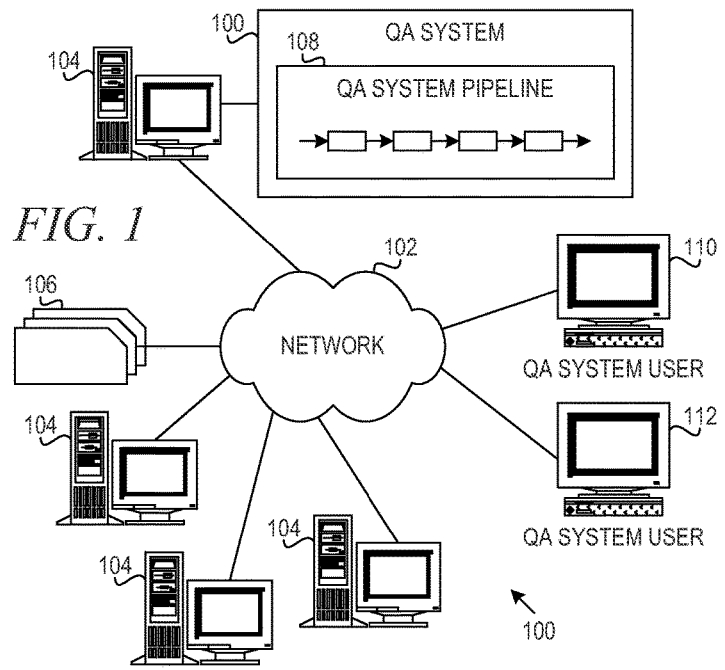
FIG. 1 depicts a schematic diagram of one illustrative embodiment of a question/answer creation (QA) system in a computer network.

The illustrative embodiments provide mechanisms for enhancing knowledge delivery and attainment using a question answering system. As companies work to reduce travel and training costs, the number of cases in which it is practical to have an instructor teach in front of a group of students have been severely reduced. Organizations and individuals do not want to spend the time or money to attend an information session at a physical location if an equivalent alternative is available. Some training has shifted to distance learning, the online version of a classroom. In many cases, however, this approach presents challenges. For global organizations, the range of time zones sometimes makes it impractical to conduct live training sessions over the Internet.

Due to the above and other factors, recorded training sessions, whether audio only, audio with slides, or video, have become increasingly more prevalent. A significant downside to the recorded event, though, is that the element of interaction is lost in this process. There are currently some methods for increasing interaction with the recording itself, such as click-able items and built-in quizzes; however, while these may help from an attention perspective, they do not actually allow the interaction to occur as it would in standard instructor-led training.

For recorded events, help files are necessarily static. Help files cannot be updated in real time during delivery nor can they be easily modified to link to new or updated material. Help files cannot react to audience queries and cannot dynamically adjust to audience interest to help direct the audience to relevant content. Help tiles cannot do data mining, especially in real time, to help the presenter react if a large portion of the audience begins asking questions indicating some confusion or need for clarification. In a recorded setting, help tiles focus on the process of finding information rather than the process of gaining knowledge.

In accordance with the illustrative embodiments, a question answering (QA) system provides enriched content- and context-related assistance for broadcast style or recorded deliveries of presentation content. The QA system may provide feedback to a live presenter or a presentation system delivering a recorded event. The feedback identifies which topics of the presentation are well-understood by an audience, as well as which topics require improved or additional content.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
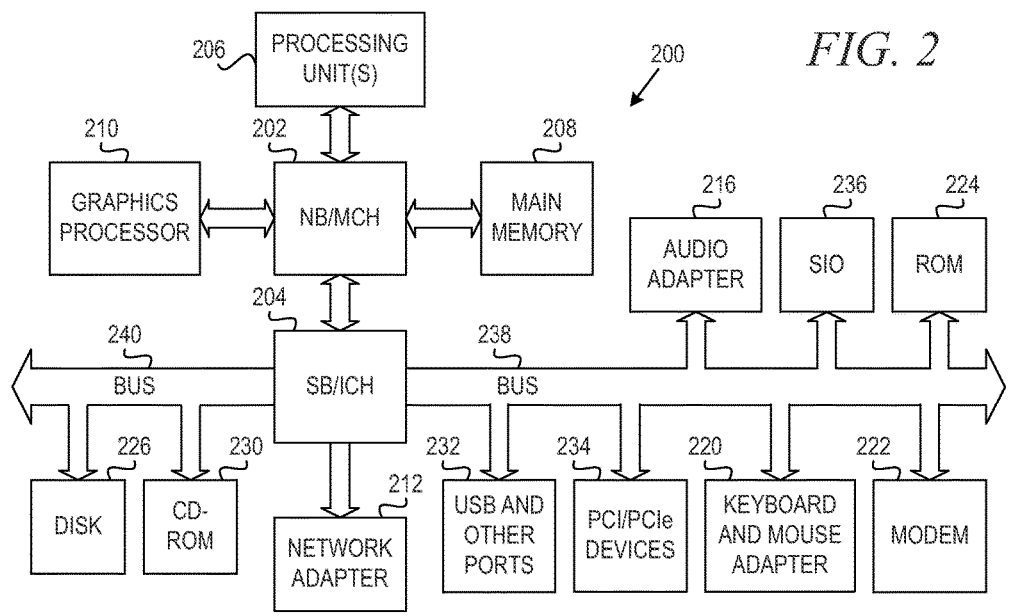
FIG. 2 is a block diagram of an example data processing system in which aspects of the illustrative embodiments are implemented.
Figure 3:
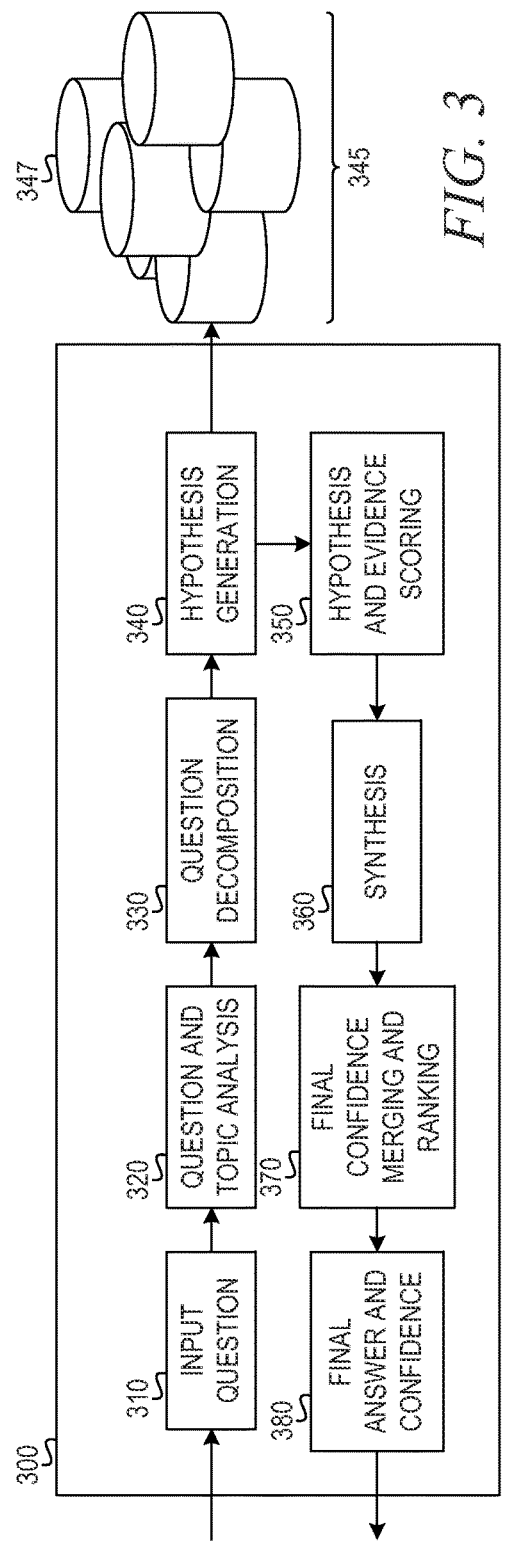
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments are integrated in, augment, and extend the functionality of these QA mechanisms with regard to enhancing knowledge delivery and attainment for live or recorded delivery of presentation content.

Thus, it is important to first have an understanding of how question and answer creation in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may took at the matching of terms and synonyms within the language of the input question and the found portions of the corpus of data. Other reasoning algorithms may look at temporal or spatial features in the language, white others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enables question/answer (QA) generation functionality for one or more QA system users via their respective computing devices 110-112. Other embodiments of the QA system 100 may be used with components, systems, sub-systems, and/or devices other than those that are depicted herein.

The QA system 100 is configured to implement a QA system pipeline 108 that receive inputs from various sources. For example, the QA system 100 receives input from the network 102, a corpus of electronic documents 106, QA system users, and/or other data and other possible sources of input. In one embodiment, some or all of the inputs to the QA system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 that are answered by the content in the corpus of data 106. In one embodiment, the questions are formed using natural language. The QA system 100 parses and interprets the question, and provides a response to the QA system user, e.g., QA system user 110, containing one or more answers to the question. In some embodiments, the QA system 100 provides a response to users in a ranked list of candidate answers while in other illustrative embodiments, the QA system 100 provides a single final answer or a combination of a final answer and ranked listing of other candidate answers.

The QA system 100 implements a QA system pipeline 108 which comprises a plurality of stages for processing an input question and the corpus of data 106. The QA system pipeline 108 generates answers for the input question based on the processing of the input question and the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, a presentation system delivers live or recorded presentation content from a server 104 to users at clients 110, 112. QA system users at clients 110, 112 interact with QA system 100 during the presentation to ask questions, or simply make comments, about the presentation to enhance the presentation content without necessarily disrupting the presentation flow. Users may interact with QA system 100 in a manner similar to a chat session. In alternative embodiments, QA system 100 may receive questions by voice or video messages. QA system 100 provides answers to questions and/or supplemental content not included in the presentation content within the scope of the presented topic.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to took for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given tower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion," These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question, The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

Figure 4:
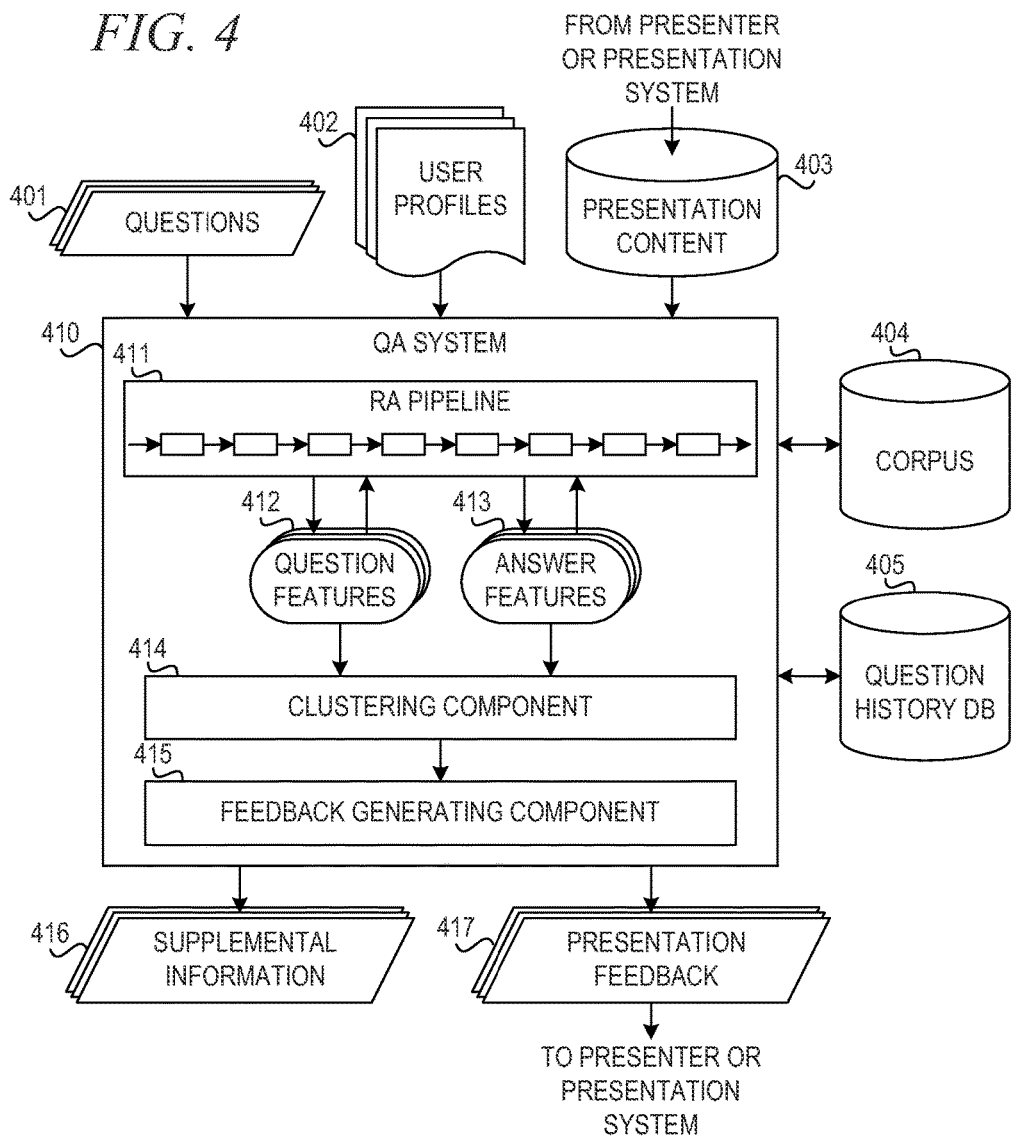
FIG. 4 is a block diagram of a question answering system for enhancing knowledge delivery and attainment for delivery of presentation content in accordance with an illustrative embodiment.

FIG. 4 is a block diagram of a question answering system for enhancing knowledge delivery and attainment for delivery of presentation content in accordance with an illustrative embodiment. A presenter or presentation system delivers presentation content 403 to a group of users. Question answering (QA) system 410 receives questions 401 from the group of users who are viewing or listening to a live or recorded presentation. QA system 410 provides answers to questions 401 in the form of supplemental information 416 based on information in corpus 404 and, in one embodiment, presentation content 403. QA system 410 may return supplemental information 416 to the users asking the question.

QA system 410 may access presentation content 403 by interfacing with a presentation system. Corpus 404 may also include information from training oriented material from internal and possibly external sites depending on the presentation topic. The training oriented material may include whitepapers, presentations, etc. QA system 410 may actively listen to live or recorded presentations. QA system 410 may be connected in the background with context to any video or audio prompts that may be relevant shortly before a question is asked.

QA system 410 includes reasoning algorithm (RA) pipeline 411, which generates question features 412 from questions 401 and answer features 413 from candidate answers generated from corpus 404 and/or presentation content 403. Question features 412 may include, for example, Lexical Answer Type (LAT), focus, question classification, etc. Answer features 413 may include, for example, sources of evidentiary support for answers, answer confidence, etc. QA system 410 stores question information in question history database (DB) 405. The question information may include the question text, question features, high confidence answers, sources of evidentiary support, identification of the user and/or user group, etc.

Clustering component 414 performs clustering on received questions 401, as well as questions in question history DB 405. Cluster analysis or clustering is the task of grouping a set of objects in such a way that objects in the same group (i.e., a cluster) are more similar in some sense or another to each other than to those in other groups (clusters). Clustering is a main task of exploratory data mining, and a common technique for statistical data analysis, used in many fields, including machine learning, pattern recognition, image analysis, information retrieval, and bioinformatics.

In one example embodiment, clustering component 414 uses k-means clustering. The k-means clustering algorithm is a technique of vector quantization, originally from signal processing, that is popular for cluster analysis in data mining. The k-means clustering algorithm aims to partition n observations into k clusters in which each observation belongs to the cluster with the nearest mean, serving as a prototype of the cluster.

Clustering component 414 groups questions into question clusters based on similarity of question features 412 and answer features 413. In one example embodiment, clustering component 414 stores information about question clusters in question history DB 405. In one embodiment, QA system 410 uses capabilities of RA pipeline 411 to identify a topic of the questions. For example, consider a presentation about changes to health care law. Users viewing the presentation may ask questions about the subject matter being presented. One or two users may ask about a particular state's insurance exchange, but many users may ask about children's dental coverage. In this example, clustering component 414 clusters the questions about the topic of "state-run insurance exchange" in one cluster and the questions about "children's dental coverage" in another cluster.

Feedback generating component 415 generates presentation feedback 417 based on the question clusters determined by clustering component 414. Feedback generating component 415 provides presentation feedback 417 to the presenter or presentation system.

In one embodiment, feedback generating component 415 generates presentation feedback 417 according to a number of questions in each cluster. That is for questions that have been asked only a few times, feedback generating component 415 may simply provide supplemental information 416 to the users asking the questions without interrupting or modifying the presentation. However, in response to a number of questions in a cluster exceeding a first threshold, feedback generating component 415 generates feedback for updating future presentation content to include supplemental information 416 for the given question topic not contained in the presentation content 403. In response to the number of questions in the cluster exceeding a second threshold, feedback generating component 415 generates feedback for updating current presentation content 403 to include supplemental information 416 for the given question topic not contained in the presentation content 403.

In an example embodiment, feedback generating component 415 accesses presentation content 403 to determine whether supplemental information 416 is present in presentation content 403. If feedback generating component 415 determines that a cluster of questions will be answered later in the presentation, then feedback generating component 415 does not update current or future presentation content. However, if feedback generating component 415 determines that users are asking questions for which presentation content 403 does not provide support, then feedback generating component 415 generates presentation feedback 417 to update presentation content 403.

In an illustrative embodiment, users or groups of users provide user profile 402. The creator of the presentation may customize presentation content 403 for a particular group of users based on information in user profiles 402. That is, the creator of presentation content 403 may determine that a group of users have sufficient understanding of some topics and need deeper knowledge for other topics based on user profiles 402.

As QA system 410 receives questions 401 and clustering component 414 groups questions 401 into clusters, feedback generating component 415 may update user profiles 402. That is, if users begin asking a high number of questions about a particular topic, feedback generating component 415 may determine that the group of users require more information about that topic. Thus, feedback generating component 415 updates user profiles 402 to indicate that the group of users require more information about the identified topic. In an alternative embodiment, QA system 410 ingests profile information from user profiles 402 and stores the information in question history DB 405.

The features of QA system 410, as described above with respect to FIG. 4, may be used in many ways. In most live broadcast presentations, there is a concurrent chat session for the audience to post questions and for the conference moderator to post information. Leveraging this interface, QA system 410 would act in the moderator role providing faster answers to questions and optionally providing reference links for additional related content, such as whitepapers, presentations, videos, or other content on a relevant topic. This reference information could be provided in a verbose chat session or accumulated and later posted with the content of the live presentation.

QA system 410 could discretely provide feedback to the presenter to assist with positioning or delivery of the presentation content. Chat comments may provide insight that the audience needs more than explanation or that there is a strong interest in subject matter that was not planned to receive significant attention. QA system 410 could provide cues to the presenter along with recommended content to redirect the presentation accordingly. The presenter may still elect to stay the course of the presentation or may lightly or heavily leverage the recommended content to better satisfy the audience based on the level of interest, based on similar questions or a quick poll.

QA system 410 may redirect the flow of a presentation based on a weighted average of the expertise of the current audience or from the types of questions being asked. QA system 410 receives input from the audience of a replay of a presentation and may control the presentation itself.

During replay of a presentation, QA system 410 may harvest questions from viewers and provide answers and references as appropriate that would enhance the value of the answer. As with a live presentation with a chat session, a context sensitive chat environment with QA system 410 can be leveraged to enable better relevancy for the presumably smaller audience.

QA system 410 may allow the replay of presentation content to flow differently based on the types of questions asked in a chat session. QA system 410 would answer new chat questions even for a replayed session. An individual or smaller group of users watching a replay may have different needs than the larger audience that attended the live session. For example, someone who participated in the live session may want to build deeper insights on a specific set of topics. Providing keywords or tags to the QS system 410 may trigger a customized abbreviated view of the material and cause new recommended content to be suggested for further study.

QA system 410 may allow viewers of a replay to choose one's own custom session based on current knowledge level. An individual could leverage the replay session as part of a broader knowledge need. QA system 410 would utilize assets and integrate them to provide a set of information and recommended approach to study, serving up information as a high level overview, building block approach, lecture series, or another appropriate structured format.

QA system 410 may conduct a pre-presentation survey of invitees to better determine the content or how the presentation should flow. Typically, presentation material is a small subset of the available presentation content in order that the presentation material fits into a certain time format, for example in a one-hour time slot. At least a few days prior to the live presentation, QA system 410 would collect brief survey information from the prospective audience to help the presenter tailor the presentation or be better prepared for some deeper questions that may arise.

QA system 410 may provide auto-generated content (e.g., presentation, help file, video) of information based on initial topic and questions asked during replay. In the absence of known existing presentations, a user can initiate an education advisor interface providing a topic set or short curriculum and receive a structured reference to assets to methodically leverage content to build knowledge. Building a worthwhile recommendation would likely require a conversational interface that collects details about scope, depth, time focus, and calendar time, as well as other parameters to support the objective.

A product delivered with a presentation and QA system 410 can replace an installation or configuration guide. Such a presentation could be interactive based on metadata or learned experience of a user. Instead of step-by-step instructions on paper, QA system 410 can generate a set of dynamic content delivered to a smartphone, tablet, or similar device that would include up-to-date detailed instructions utilizing demonstration videos, pictures and diagrams, audio delivered content, and helpful references for more information. This content would be device and data bandwidth appropriate.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the users computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
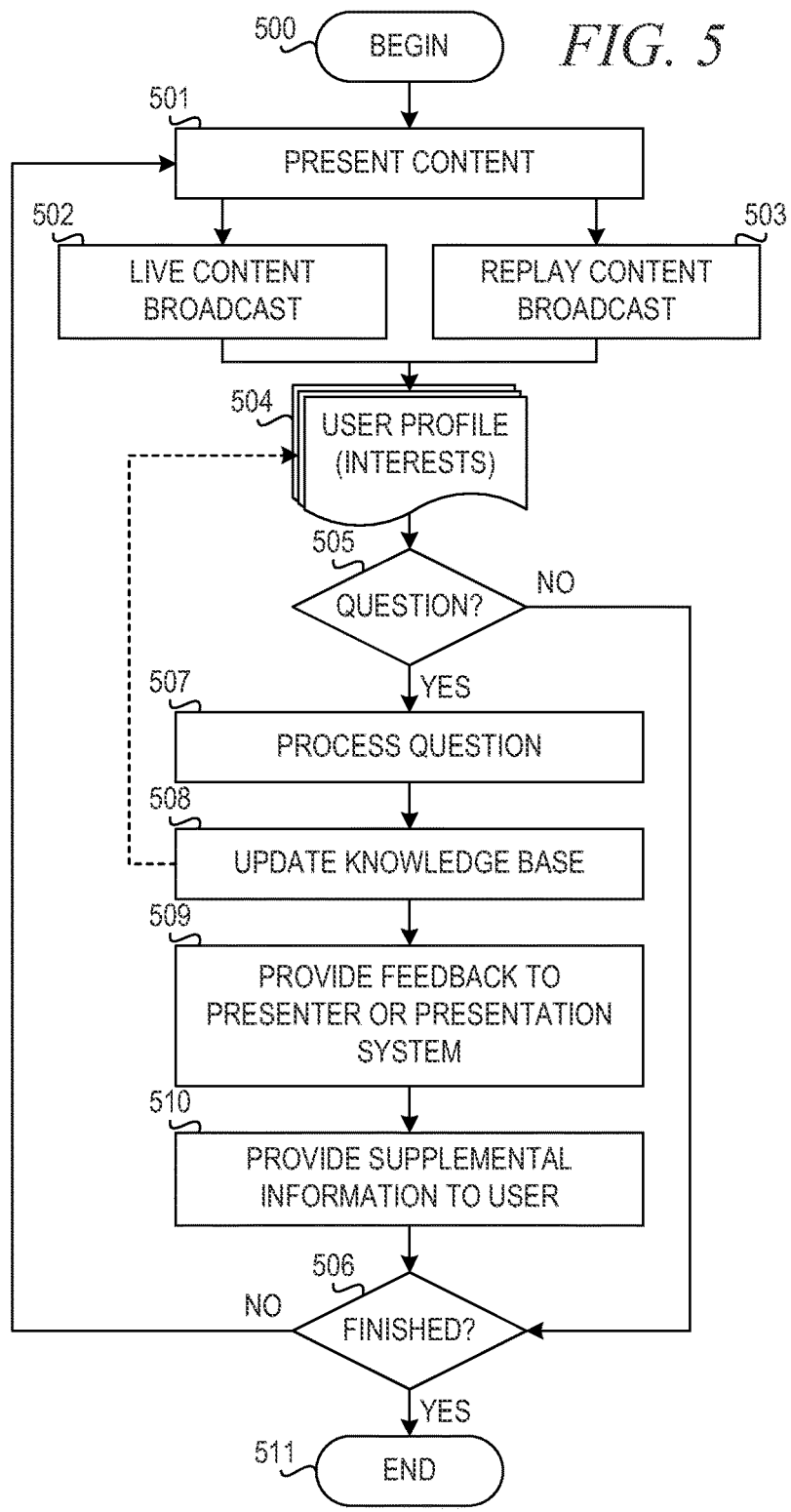
FIG. 5 is a flowchart illustrating operation of a mechanism for enhancing knowledge delivery and attainment for delivery of presentation content in accordance with an illustrative embodiment.

FIG. 5 is a flowchart illustrating operation of a mechanism for enhancing knowledge delivery and attainment for delivery of presentation content in accordance with an illustrative embodiment. Operation begins (block 500), and the mechanism presents content (block 501). The mechanism may present the content as a live content broadcast (block 502) or a replay of a content broadcast (block 503). Thereafter, the mechanism obtains user profiles, which specify user interests (block 504).

Then, the mechanism determines whether a question is received (block 505). If the mechanism does not receive a question, the mechanism determines whether the presentation is finished (block 506). If the presentation is not finished, operation returns to block 501 to present content.

If the mechanism receives a question in block 505, the mechanism processes the question using a question answering system (block 507). Operation of a question answering system is described in detail with reference to FIGS. 1-3. Next, the mechanism updates a knowledge base (block 508). The knowledge base may comprise question history DB 405 and cluster information generated by clustering component 414 in FIG. 4. In one embodiment, updating the knowledge base may comprise updating user profiles in block 504.

The mechanism then provides feedback to the presenter or presentation system (block 509). In one embodiment, the feedback includes recommendations to update presentation content for the current or future presentations. The mechanism also provides supplemental information to the user asking the question (block 510).

Thereafter, the mechanism determines whether the presentation is finished (block 506). If the mechanism determines the presentation is not finished, operation returns to block 501 to present content. If the mechanism determines the presentation is finished in block 506, then operation ends (block 511).

Figure 6:
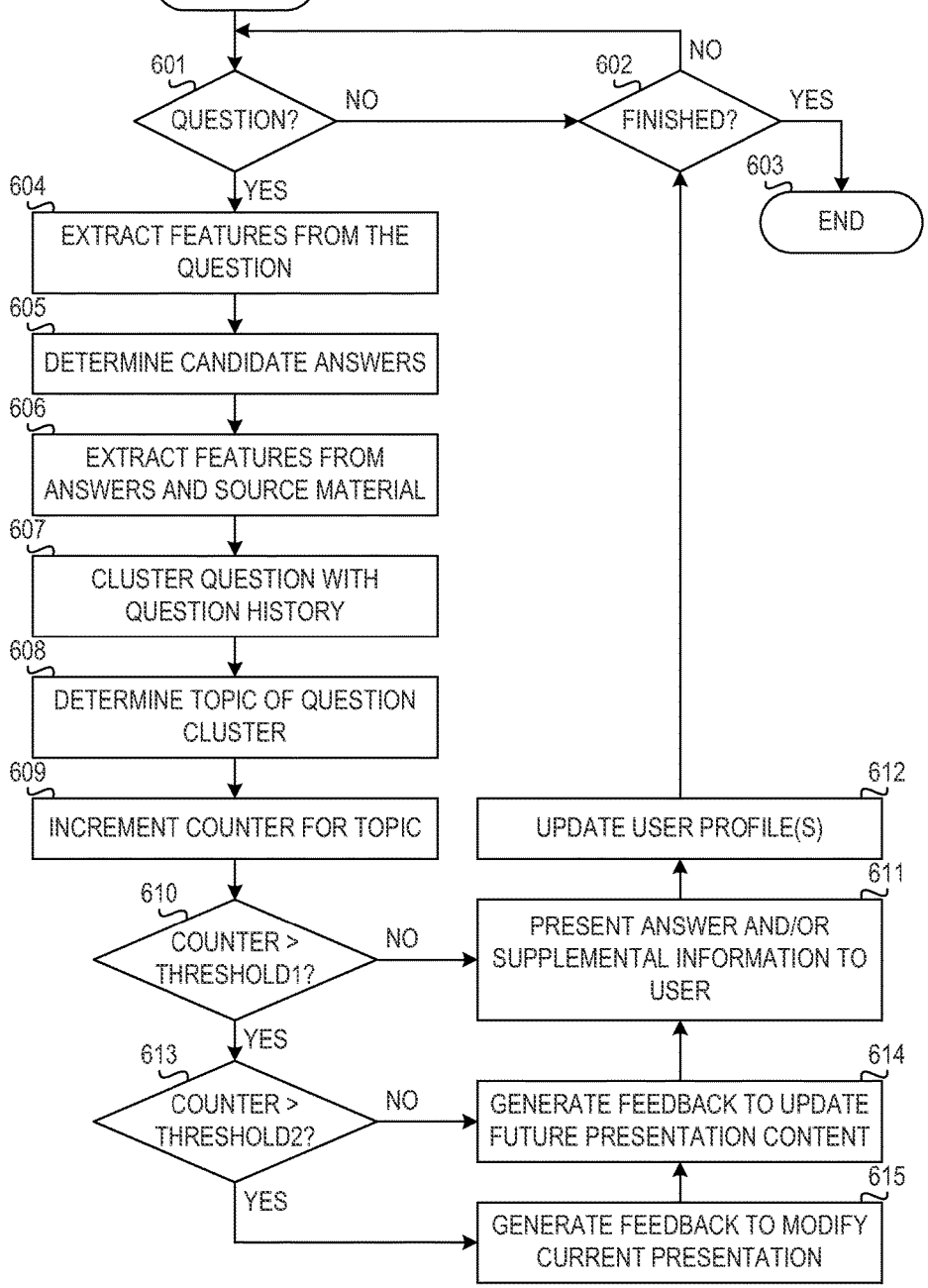
FIG. 6 is a flowchart illustrating operation of a question answering system for enhancing knowledge delivery and attainment for delivery of presentation content in accordance with an illustrative embodiment.

FIG. 6 is a flowchart illustrating operation of a question answering system for enhancing knowledge delivery and attainment for delivery of presentation content in accordance with an illustrative embodiment. Operation begins (block 600), and the QA system determines whether a question is received (block 601). If the QA system determines that a question is not received, the QA system determines whether the presentation is finished (block 602). If the presentation is not finished, operation returns to block 601 to determine whether a question is received. If the QA system determines the presentation is finished in block 602, then operation ends (block 603).

If the QA system receives a question in block 601, then the QA system extracts features from the question (block 604). The QA system determines candidate answers to the question (block 605) and extracts features from the answers and source material (block 606). The QA system clusters the question with a question history (block 607) and determines a topic of the question cluster (block 608). Then, the QA system increments a counter for the topic associated with the question cluster (block 609).

The QA system determines whether the counter is greater than a first threshold (THRESHOLD1) (block 610). If the counter is not greater than the first threshold, then the QA system presents the answer and/or supplemental information to the user (block 611). Then, the QA system updates a user profile associated with the user or the group of users viewing the presentation (block 612). Thereafter, operation proceeds to block 602 to determine whether the presentation is finished.

If the counter is greater than the first threshold in block 610, the QA system determines whether the counter is greater than a second threshold (THRESHOLD2) (block 613). If the counter is not greater than the second threshold, then the QA system generates feedback to update future presentation content (block 614). Then, the QA system presents the answer and/or supplemental information to the user (block 611) and updates a user profile associated with the user or the group of users viewing the presentation (block 612). Thereafter, operation proceeds to block 602 to determine whether the presentation is finished.

If the counter is greater than the second threshold in block 613, then the QA system generates feedback to modify the current presentation (block 615). Then, the QA system generates feedback to update future presentation content (block 614), presents the answer and/or supplemental information to the user (block 611), and updates a user profile associated with the user or the group of users viewing the presentation (block 612). Thereafter, operation proceeds to block 602 to determine whether the presentation is finished.

The flowchart, and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a memory, wherein the memory comprises instructions which are executed by the processor to cause the processor to implement a question answering system for presentation delivery, the method comprising:

delivering a presentation content by a presenter to a group of users;

receiving, by the question answering system, a plurality of questions concerning the presentation content from the group of users;

for each received question, generating, by a hypothesis generation stage of the question answering system, one or more candidate answers based on a corpus of information and presenting, by the question answering system, the one or more candidate answers to a user that submitted the received question;

storing, by the question answering system, question information for the plurality of questions in a question history database, wherein the question information comprises question text, one or more candidate answers, and supplemental information from the corpus of information providing evidentiary support for the one or more candidate answers;

clustering, by a clustering component executing within the question answering system, the plurality of questions in the question history database into one or more question clusters based on similarity of question features and answer features;

determining, by the question answering system, a topic for each of the one or more question clusters to form one or more question topics;

identifying, by a feedback generating component executing within the question answering system, supplemental information for a given question topic that is in the question history database but not contained in the presentation content;

generating, by the feedback generating component, feedback based on the one or more question topics, wherein the feedback comprises the identified supplemental information; and providing, by the question answering system, the feedback to the presenter.

2. The method of claim 1, wherein generating feedback comprises generating alerts to the presenter to alter the presentation based on the one or more question topics.

3. The method of claim 1, wherein clustering the plurality of questions comprises:

extracting a set of features from each question within the plurality of questions, wherein each feature in the set of features has a feature value; and performing a clustering operation on the plurality of questions to group questions having similar feature values.

4. The method of claim 3, wherein performing the clustering operation on the plurality of questions comprises performing a k-means clustering algorithm on the plurality of questions.

5. The method of claim 3, wherein the set of features comprise a lexical answer type, a focus, and a question classification.

6. The method of claim 1, wherein presenting the one or more candidate answers comprises presenting supplemental information not contained in the presentation content to the user.

7. The method of claim 1, wherein clustering the plurality of questions comprises:

extracting a set of features from each question within the plurality of questions and each candidate answer, wherein each feature in the set of features has a feature value; and performing a clustering operation on the plurality of questions, wherein the clustering operation groups questions having similar feature values.

8. The method of claim 1, wherein generating the feedback comprises:
for each question grouped in a given question topic, incrementing a topic counter;
responsive to the topic counter exceeding a first threshold, generating the feedback identifying the supplemental information for the given question topic not contained in the presentation content.

9. The method of claim 8, wherein generating the feedback further comprises:
responsive to the topic counter exceeding a second threshold, generating the feedback identifying customized presentation content redirecting the delivery of the presentation content to the group of users based on the one or more question clusters.

10. The method of claim 1, wherein the presentation content is customized for the group of users based on one or more user profiles of the group of users.

11. The method of claim 10, further comprising updating the one or more user profiles based on the one or more question topics.

12. The method of claim 11, wherein generating feedback comprises generating the feedback for the group of users based on the one or more updated user profiles.

13. A computer program product comprising a computer readable storage medium having a computer readable program stored therein, wherein the computer readable program, when executed on a computing device, causes the computing device to implement a question answering system for presentation delivery, wherein the computer readable program causes the computing device to:
deliver a presentation content by a presenter to a group of users;
receive, by the question answering system, a plurality of questions concerning the presentation content from the group of users;
for each received question, generate, by a hypothesis generation stage of the question answering system, one or more candidate answers based on a corpus of information and present, by the question answering system, a highest confidence answer within the one or more candidate answers to a user that submitted the received question;
store, by the question answering system, question information for the plurality of questions in a question history database, wherein the question information comprises question text, one or more candidate answers, and supplemental information from the corpus of information providing evidentiary support for the one or more candidate answers;
cluster, by a clustering component executing within the question answering system, the plurality of questions in the question history database into one or more question clusters;
determine, by the question answering system, a topic for each of the one or more question clusters to form one or more question topics;
identify, by a feedback generating component executing within the question answering system, supplemental information for a given question topic that is in the question history database but not contained in the presentation content;
generate, by the question answering system, feedback based on the one or more question topics, wherein the feedback comprises the identified supplemental information; and
provide, by the question answering system, the feedback to the presenter.

14. The computer program product of claim 13, wherein clustering the plurality of questions comprises:
extracting a set of features from each question within the plurality of questions, wherein each feature in the set of features has a feature value; and
performing a clustering operation on the plurality of questions, wherein the clustering operation groups questions having similar feature values.

15. The computer program product of claim 13, wherein generating feedback for updating the presentation content comprises:
for each question grouped in a given question topic, incrementing a topic counter;
responsive to the topic counter exceeding a first threshold, generating the feedback identifying supplemental information for the given question topic not contained in the presentation content.

16. The computer program product of claim 15, wherein generating the feedback further comprises:
responsive to the topic counter exceeding a second threshold, generating the feedback identifying customized presentation content redirecting the delivery of the presentation content to the group of users based on the one or more question clusters.

17. An apparatus comprising:
a processor; and
a memory coupled to the processor, wherein the memory comprises instructions which, when executed by the processor, cause the processor to implement a question answering system for presentation delivery, wherein the instructions cause the processor to:
deliver a presentation content by a presenter to a group of users;
receive, by the question answering system, a plurality of questions concerning the presentation content from the group of users;
for each received question, generate, by a hypothesis generation stage of the question answering system, one or more candidate answers based on a corpus of information and present, by the question answering system, a highest confidence answer within the one or more candidate answers to a user that submitted the received question;
store, by the question answering system, question information for the plurality of questions in a question history database, wherein the question information comprises question text, one or more candidate answers, and supplemental information from the corpus of information providing evidentiary support for the one or more candidate answers;
cluster, by a clustering component executing within the question answering system, the plurality of questions in the question history database into one or more question clusters;
determine, by the question answering system, a topic for each of the one or more question clusters to form one or more question topics;
identify, by a feedback generating component executing within the question answering system, supplemental information for a given question topic that is in the question history database but not contained in the presentation content;

generate, by the question answering system, feedback based on the one or more question topics, wherein the feedback comprises the identified supplemental information; and provide, by the question answering system, the feedback to the presenter.

18. The apparatus of claim 17, wherein clustering the plurality of questions comprises:

extracting a set of features from each question within the plurality of questions, wherein each feature in the set of features has a feature value; and performing a clustering operation on the plurality of questions, wherein the clustering operation groups questions having similar feature values.

19. The apparatus of claim 17, wherein generating the feedback comprises:

for each question grouped in a given question topic, incrementing a topic counter;

responsive to the topic counter exceeding a first threshold, generating the feedback identifying the supplemental information for the given question topic not contained in the presentation content.

20. The apparatus of claim 19, wherein generating the feedback further comprises:

responsive to the topic counter exceeding a second threshold, generating the feedback identifying customized presentation content redirecting the delivery of the presentation content to the group of users based on the one or more question clusters.

\* \* \* \* \*